(12) United States Patent
Kwon

(10) Patent No.: US 11,761,135 B2
(45) Date of Patent: Sep. 19, 2023

(54) LAUNDRY TREATING APPARATUS

(71) Applicant: LG ELECTRONICS INC., Seoul (KR)

(72) Inventor: Yongdeok Kwon, Seoul (KR)

(73) Assignee: LG ELECTRONICS, INC., Seoul (KR)

( * ) Notice: Subject to any disclaimer, the term of this patent is extended or adjusted under 35 U.S.C. 154(b) by 0 days.

(21) Appl. No.: 17/833,579

(22) Filed: Jun. 6, 2022

(65) Prior Publication Data

US 2022/0307187 A1 Sep. 29, 2022

Related U.S. Application Data

(62) Division of application No. 16/502,873, filed on Jul. 3, 2019, now Pat. No. 11,365,500.

(30) Foreign Application Priority Data

Jul. 6, 2018 (KR) ........................ 10-2018-0078893

(51) Int. Cl.
*D06F 21/04* (2006.01)
*D06F 25/00* (2006.01)
(Continued)

(52) U.S. Cl.
CPC .............. *D06F 37/04* (2013.01); *D06F 21/04* (2013.01); *D06F 25/00* (2013.01); *D06F 37/22* (2013.01);
(Continued)

(58) Field of Classification Search
None
See application file for complete search history.

(56) References Cited

U.S. PATENT DOCUMENTS

2005/0252252 A1   11/2005   Lee et al.
2009/0211311 A1   8/2009    McMaster et al.
(Continued)

FOREIGN PATENT DOCUMENTS

CN   101037838 A   9/2007
CN   102421953 A   4/2012
(Continued)

OTHER PUBLICATIONS

Chinese Office Action in Chinese Application No. 201910602351.2, dated Feb. 3, 2021 (13 pages).
(Continued)

*Primary Examiner* — Levon J Shahinian
(74) *Attorney, Agent, or Firm* — Birch, Stewart, Kolasch & Birch, LLP

(57) ABSTRACT

A laundry treating apparatus having a tub, a drum rotatably disposed inside the tub and configured to store laundry therein, and a connector connecting the drum to a rotary shaft of a motor for transferring a rotation power to the drum. The connector includes a first body having a first body hub and a first body arm, a second body having a second body hub and a second body arm extending along the first body arm, connecting portions spaced apart from each other and connecting the first body and the second body in a manner that the first body is spaced apart from the second body, and a rib disposed between a pair of the connecting portions. The rib protrudes from one of the first body arm and the second body arm and is spaced apart from the other of the first body arm and the second body arm.

19 Claims, 6 Drawing Sheets

(51) Int. Cl.
- *D06F 37/04* (2006.01)
- *D06F 37/22* (2006.01)
- *D06F 37/26* (2006.01)
- *D06F 37/30* (2020.01)
- *D06F 37/40* (2006.01)
- *D06F 39/12* (2006.01)
- *D06F 58/02* (2006.01)
- *D06F 58/08* (2006.01)

(52) U.S. Cl.
CPC .......... *D06F 37/261* (2013.01); *D06F 37/269* (2013.01); *D06F 37/30* (2013.01); *D06F 37/40* (2013.01); *D06F 39/12* (2013.01); *D06F 58/02* (2013.01); *D06F 58/08* (2013.01); *Y02B 40/00* (2013.01)

(56) References Cited

U.S. PATENT DOCUMENTS

| | | |
|---|---|---|
| 2013/0327099 A1 | 12/2013 | Bae et al. |
| 2018/0179686 A1 | 6/2018 | Jo et al. |

FOREIGN PATENT DOCUMENTS

| | | |
|---|---|---|
| CN | 103485126 A | 1/2014 |
| CN | 106498660 A | 3/2017 |
| CN | 106661795 A | 5/2017 |
| EP | 2671995 A1 | 12/2013 |
| EP | 3444392 A1 | 2/2019 |
| KR | 10-2001-0003902 A | 1/2001 |
| KR | 10-2007-0106882 A | 11/2007 |
| KR | 10-0805231 B1 | 2/2008 |
| KR | 10-2009-0038185 A | 4/2009 |
| KR | 10-2010-0108894 A | 10/2010 |
| KR | 10-2013-0077997 A | 7/2013 |
| KR | 10-2013-0137528 A | 12/2013 |
| KR | 10-2017-0039470 A | 4/2017 |
| KR | 10-2018-0023288 A | 3/2018 |
| WO | WO 2019/035532 A1 | 2/2019 |

OTHER PUBLICATIONS

European Search Report from the European Patent Office in European Application No. 19182819.3, dated Dec. 17, 2019 (8 pages).
Office Action received from the Australian Patent Office in Australian Patent Application No. 2019204701, dated Mar. 5, 2020 (4 pages).

LAUNDRY TREATING APPARATUS

CROSS-REFERENCE TO RELATED APPLICATIONS

This application is a Divisional of U.S. application Ser. No. 16/502,873, filed on Jul. 3, 2019, which claims priority under 35 U.S.C. § 119 to Korean Patent Application No. 10-2018-0078893, filed on Jul. 6, 2018, all of which are hereby expressly incorporated by reference into the present application.

BACKGROUND

Technical Field

The present disclosure relates to a laundry treating apparatus.

Discussion of the Related Art

A laundry treating apparatus includes an apparatus for washing laundry, an apparatus for drying laundry, and an apparatus for performing both washing and drying laundry. Laundry treating apparatuses of the related art are categorized into a front loading type laundry treating apparatus having a laundry inlet provided on a front surface to load laundry therein and a top loading type laundry treating apparatus having a laundry inlet provided on an upper surface to load laundry therein.

In any type, the laundry treating apparatus of the related art includes a tub in which water is stored, a drum provided inside the tub, storing laundry therein, a motor generating a rotation power, and a connector for connecting the drum with the motor to transfer the rotation power of the motor to the drum.

The connector is fixed to a rear surface of the drum in the front loading type laundry treating apparatus, and the connector is fixed to the bottom of the drum in the top loading type laundry treating apparatus. Therefore, the laundry treating apparatuses of the related art have problems in that it is difficult to check whether particles remain in the connector and it is also difficult to clean the connector.

SUMMARY

Accordingly, the present disclosure provides a laundry treating apparatus that substantially obviates one or more problems discussed above due to limitations and disadvantages of the related art.

An object of the present disclosure is to provide a connector, which may be configured to minimize particles remaining therein, and a laundry treating apparatus comprising the connector.

Still another object of the present disclosure is to provide a connector configured to stably transfer a rotation power provided by a motor to a drum, and a laundry treating apparatus comprising the connector.

Further still another object of the present disclosure is to provide a connector, which may minimize a weight, and a laundry treating apparatus comprising the connector.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a laundry treating apparatus according to the present disclosure comprises a tub configured to store water; a drum rotatably disposed inside the tub and configured to store laundry therein, the drum comprising a first surface comprising a drum inlet configured to allow laundry to be loaded or taken out therethrough, a second surface facing the first surface, and a circumferential surface connecting the first surface to the second surface. The laundry treating apparatus comprises a first body comprising a first body hub fixed to the second surface and located in a center of rotation of the drum, and a first body arm extending from the first body hub to a rim of the second surface; a second body comprising a second body hub located in the tub, and a second body arm extending from the second body hub along a same direction as a direction in which the first body arm is extending from the first body hub; and a connecting portion connecting the first body to the second body so in manner that forms a path between the first body and the second body to allow water to pass therethrough. A rotary shaft of the drum may be fixed to the tub.

The connecting portion may comprise a plurality of connecting bodies disposed along a width direction of the first body arm, and connecting the first body arm to the second body arm, and the connecting bodies may be spaced apart from each other along a longitudinal direction of the first body arm to form the path.

The connecting bodies may be parallel to the width direction of the first body arm.

The connecting portion may comprise a plurality of connecting bodies disposed along the width direction of the first body arm and bent toward the rotary shaft or bent at a curvature toward a direction away from the rotary shaft, and the connecting bodies may connect the first body arm to the second body arm and may be spaced apart from each other along a longitudinal direction of the first body arm to form the path.

The connecting portion may comprise a first connecting body downwardly inclined from one end of both facing ends of the first body first arm toward the rotary shaft, the first connecting body connecting the first body arm with the second body arm; and a second connecting body downwardly inclined from the other end of both facing ends of the first body first arm toward the rotary shaft, the second connecting body connecting the first body arm with the second body arm.

The first connecting body and the second connecting body may be connected to each other at a connecting point and may be V-shaped toward the rotary shaft.

The connecting portion may include two or more connecting portions. A first connecting portion and a second connection portion may be spaced apart from each other along a longitudinal direction of the first body arm to form the path.

The laundry treating apparatus may comprises two or more of the connecting portions including a first connecting portion and a second connecting portion. The first connecting body of the first connecting portion and the first connecting body of the second connecting portion may be parallel to each other, and the second connecting body of the first connecting portion and the second connecting body of the second connecting portion may be parallel to each other.

A connecting point disposed in the first connecting portion may be located outside a space formed by a connection between a free end of the first connecting body of the second connecting portion and a free end of the second connecting body of the second connecting portion.

In some embodiments, a connecting point disposed in the first connecting portion may be located inside a space formed by a connection between a free end of the first connecting body of the second connecting portion and a free end of the second connecting body of the second connecting portion.

The laundry treating apparatus may further comprise a rib connecting a connecting point disposed in the first connecting portion to a connecting point disposed in the second connecting portion. The rib may be configured to prevent the first body arm from being connected to the second body arm.

A height of the rib may be shorter than an interval between the first body arm and the second body arm.

The rib may be disposed in the first body arm or the second body arm.

The connecting portion may comprise a first connecting body upwardly inclined from one end of both facing ends of the first body arm toward a direction away from the rotary shaft. The first connecting body may connect the first body arm to the second body arm. The connecting portion may comprise a second connecting body upwardly inclined from the other end of both facing ends of the first body first arm toward the direction away from the rotary shaft. The second connecting body may connect the first body arm to the second body arm.

The first connecting body and the second connecting body may be connected to each other at a connecting point and may be V-shaped toward the direction away from the rotary shaft.

The connecting portion may include a first connecting portion, a second connecting portion, and a third connecting portion, which are spaced apart from one another along the longitudinal direction of the first body first arm. The connecting point, where the first and second connecting bodies constituting the first connecting portion are connected to each other, may be located outside a space formed by a connection between a free end of the first connecting body of the second connecting portion and a free end of the second connecting body of the second connecting portion. The connecting point, where the first and second connecting bodies constituting the second connecting portion are connected to each other, may be located inside the space formed a connection between a free end of the first connecting body of the second connecting portion and a free end of the second connecting body of the second connecting portion.

According to the present disclosure, a connector configured to minimize particles remaining therein, and a laundry treating apparatus comprising the connector may be provided.

According to the present disclosure, a connector configured to stably transfer a rotation power provided by a motor to a drum, and a laundry treating apparatus comprising the connector may be provided.

According to the present disclosure, a connector configured to minimize weight, and a laundry treating apparatus comprising the connector may be provided.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Reference will now be made in detail to the preferred embodiments of the present disclosure, examples of which are illustrated in the accompanying drawings. Meanwhile, elements or control method of apparatuses which will be described below are only intended to describe the embodiments of the present disclosure and are not intended to restrict the scope of the present disclosure. Wherever possible, the same reference numbers will be used throughout the drawings to refer to the same or like parts.

Figure 1:
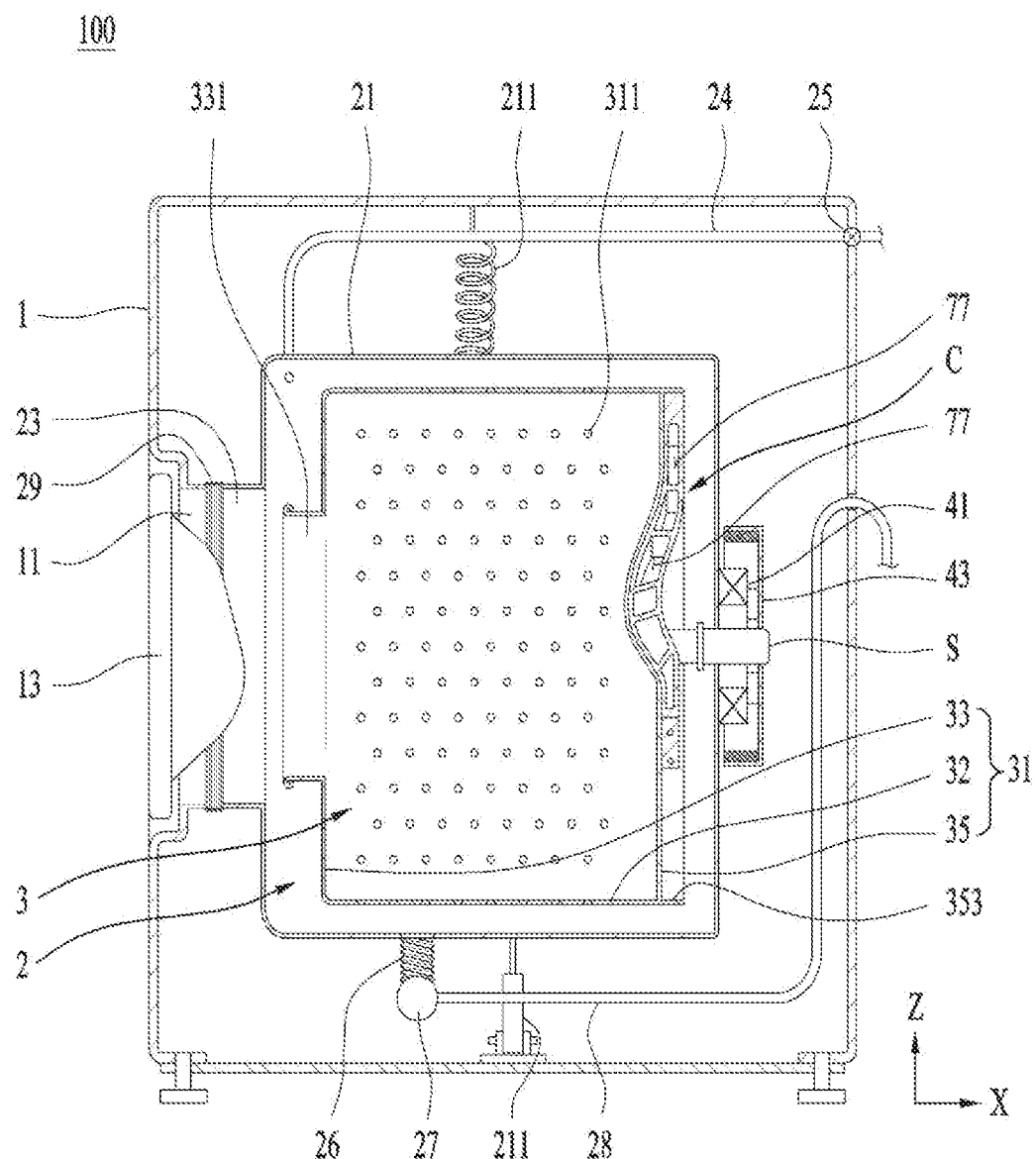
FIG. 1 illustrates an exemplary embodiment of a laundry treating apparatus according to the present disclosure.

As shown in FIG. 1, a laundry treating apparatus 100 according to the present disclosure comprises a cabinet 1, a tub 2 disposed inside the cabinet 1, providing a space in which water is stored, and a drum 3 rotatably disposed inside the tub and configured to store laundry therein.

An inlet 11, through which laundry is loaded or taken out, is disposed on a front surface of the cabinet 1, and is opened or closed by a door 13 rotatably coupled to the cabinet 1.

The tub 2 may comprise a hollow tub body 21 of a cylindrical shape, which is fixed into the cabinet 1 through a tub support unit 211. The tub support unit 211 may be configured to absorb vibration generated from the tub body 21. In this case, the tub support unit 211 may comprise a spring configured to connect an upper surface of the tub body with the cabinet, and a camper configured to connect a lower area of the tub body with the cabinet.

A tub inlet 23 is disposed on a front surface (surface located toward the inlet in the space forming the tub body) of the tub body 21, and is connected to the inlet 11 by a cylindrical gasket 29 (e.g., rubber material).

The tub body 21 is supplied with water through a water supply unit, and water stored in the tub body 21 is discharged to the outside of the cabinet 1 through a drainage unit. The water supply unit comprises a water supply pipe 24 configured to connect a water supply source with the tub body 21, and a water supply valve 25 configured to open or close the water supply pipe 24 in accordance with a control signal of a controller (not shown).

The drainage unit may comprise a pump 27, a first drainage pipe 26 guiding the water stored in the tub body 21 to the pump 27, and a second drainage pipe 28 guiding the water discharged from the pump 27 to the outside of the cabinet 1.

The drum 3 may comprise a hollow drum body 31 of a cylindrical shape. That is, the drum body 31 may comprise a circumferential surface 32 having both surfaces opened while facing each other, a first surface 33 of a disk shape fixed to the circumferential surface to form a front surface of the drum body, and a second surface 35 fixed to the circumferential surface to form a rear surface of the drum body.

The first surface 33 comprises a drum inlet 331 configured to allow laundry supplied through the tub inlet 23 to enter the inside of the drum body 31. Also, a plurality of holes 311 configured to communicate the inside of the drum body 31 with the inside of the tub body 21 are disposed in the drum body 31, the first surface 33 and the second surface 35.

A rotation power provided by motors 41 and 43 is transferred to the drum 3 through a connector C. The motor may comprise a stator 41 located outside the tub body 21, forming a rotating field, and a rotor 43 rotated by the rotating field. The stator 41 may be fixed to the rear surface of the tub body 21.

The connector C may be provided with only a rotary shaft S connecting the rotor 43 with the drum body 31. In this case, the rotary shaft S may be provided to pass through the rear surface of the tub body 21, and has one end fixed to the second surface 35 of the drum body and the other end fixed to the rotor 43.

Figure 2:
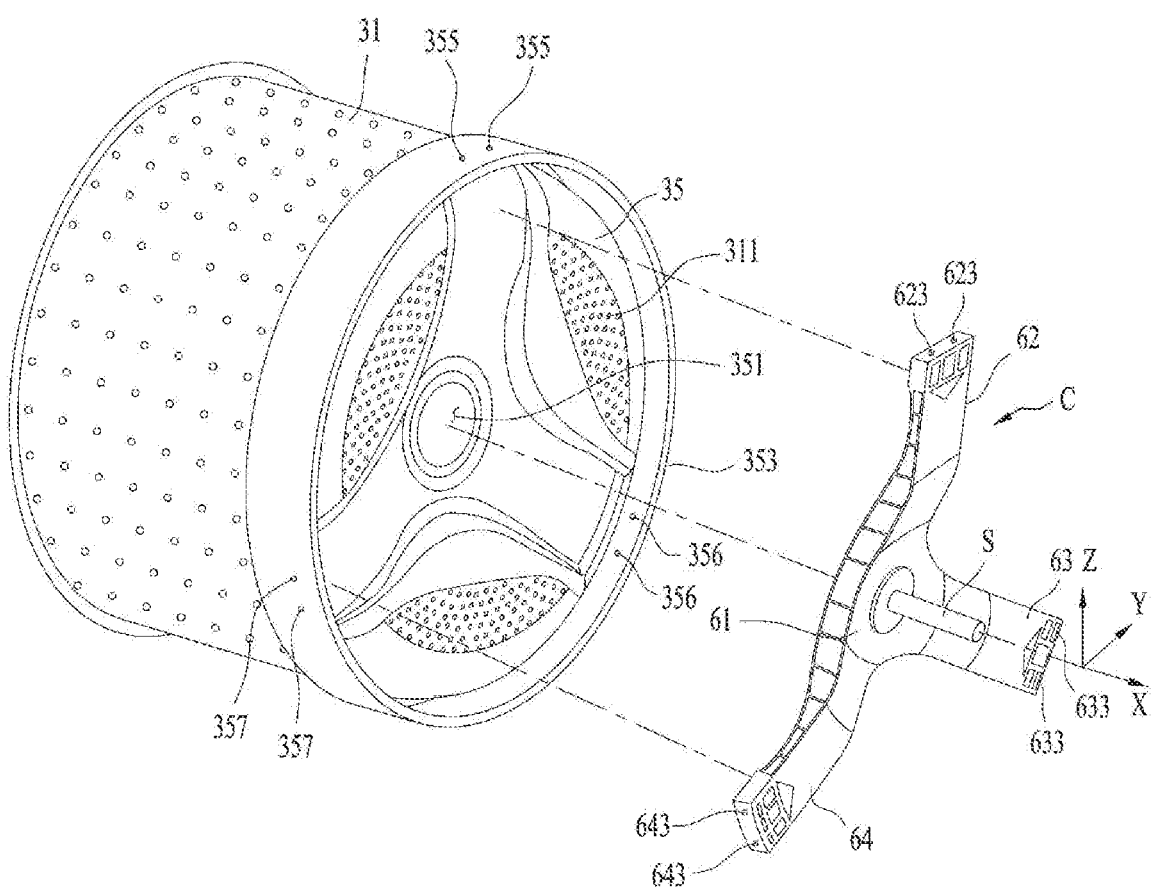
FIG. 2 illustrates an exemplary embodiment of a connector according to the present disclosure.

However, if the rotary shaft S is directly connected to the second surface 35 of the drum body, the second surface 35 may be damaged during rotation of the rotary shaft S. Therefore, as shown in FIG. 2, the connector C may further comprise a hub 61 to which the rotary shaft S is fixed, and arms 62, 63 and 64 protruding from the hub toward a rim of the second surface.

The arms may include one arm, or two or more arms protruding from the hub toward the rim of the second surface. If two or more arms are provided in the connector C, the respective arms may be spaced apart from each other at the same angle based on the hub 61. FIG. 2, for example, illustrates a connector C comprising three arms. In this case, the arms may be provided with a first arm 62, a second arm 63 and a third arm 64, which are spaced apart from one another as much as 120° based on the hub 61.

The second surface 35 may comprise a connector accommodating groove 351 such that a rotating force provided by the connector C may easily be transferred to the drum body 31. The connector accommodating groove 351 may be provided as a groove (groove formed as the rear surface of the drum is bent to be recessed toward the front surface of the drum) formed as the second surface 35 is bent to be recessed toward the direction where the first surface 33 is located. The connector accommodating groove 351 is provided in a shape corresponding to shapes of the hub 61 and the three arms 62, 63 and 64. Therefore, in the present disclosure, the rotation power provided by the motor may stably be transferred to the drum.

The drum 3 may further be provided with a fastening rib 353 to fix the connector C to the drum body 31. The fastening rib 353 may be provided as a cylindrical pipe fixed to the drum body 31 or the second surface 35, and may include a first through hole 355, a second through hole 356, and a third through hole 357.

A first fastening groove 623 may be disposed in a free end of the first arm 62, a second fastening groove 633 may be disposed in a free end of the second arm 63, and a third fastening groove 643 may be disposed in a free end of the third arm 64. The first arm 62 may be fixed to the drum 3 by a bolt fastened to the first fastening groove 623 by passing through the first through hole 355, the second arm 63 may be fixed to the drum 3 by a bolt fastened to the second fastening groove 633 by passing through the second through hole 356, and the third arm 64 may be fixed to the drum 3 by a bolt fastened to the third fastening groove 643 by passing through the third through hole 357.

Figure 3A:
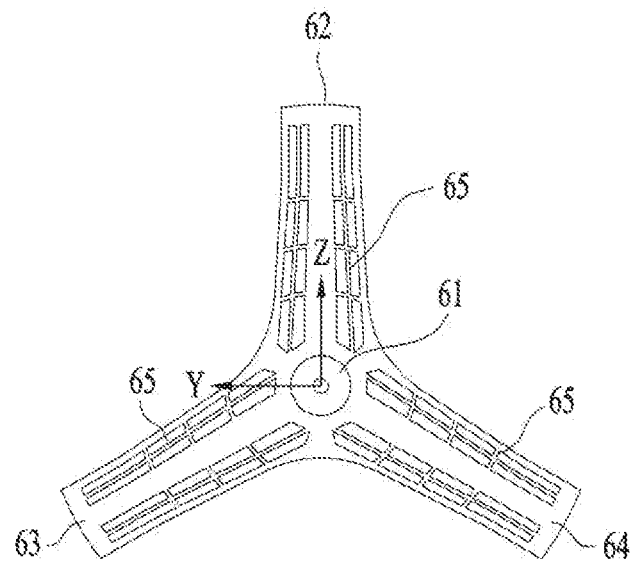
FIG. 3A illustrates another view of the connector of FIG. 2 according to the present disclosure.

As shown in FIG. 3A, in order to reinforce strength of the connector C, a strength reinforcing unit 65 may further be provided on a surface in the space provided by the connector, wherein the surface is in contact with the second surface 35.

The strength reinforcing unit 65 may be provided in such a manner that a plurality of boards cross one another to form a lattice structure. However, if the strength reinforcing unit 65 is provided in such a lattice structure, particles from laundry or detergent may remain in the space formed between the respective boards.

Figure 3B:
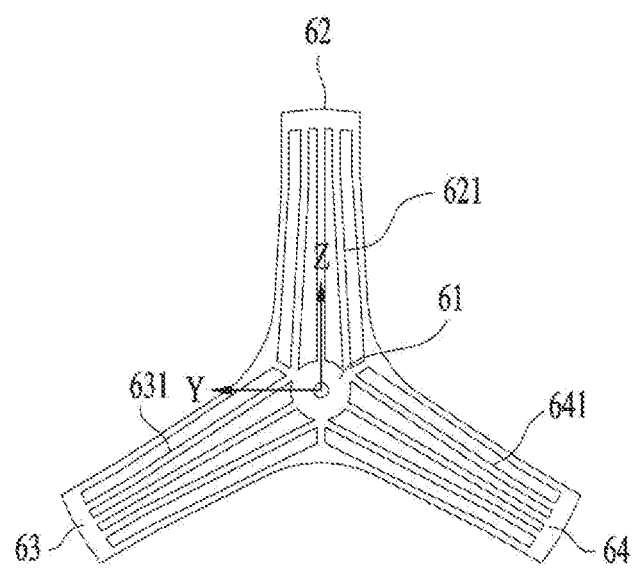
FIG. 3B illustrates another view of the connector of FIG. 2 according to the present disclosure.

In some embodiments, the strength reinforcing unit 65 may be provided in a shape shown in FIG. 3B. That is, as shown in FIG. 3B, the strength reinforcing unit 65 may comprise a first arm rib 621 provided along a longitudinal direction (Z-axis direction) of the first arm 62, a second arm rib 631 provided along a longitudinal direction of the second arm 63, and a third arm rib 641 provided along a longitudinal direction of the third arm 64.

The first arm rib 621 may comprise a plurality of boards spaced apart from one another along a width direction (Y) of the first arm 62, the second arm rib 631 may comprise a plurality of boards spaced apart from one another along a width direction of the second arm 63, and the third arm rib 641 may comprise a plurality of boards spaced apart from one another along a width direction of the third arm 64. Since the respective boards of the connector C according to this embodiment are provided along the longitudinal direction of each arm even though particles and the like enter the space between the respective boards, the particles and the like may be discharged to the outside of the connector C while the drum is being rotated.

Figure 4:
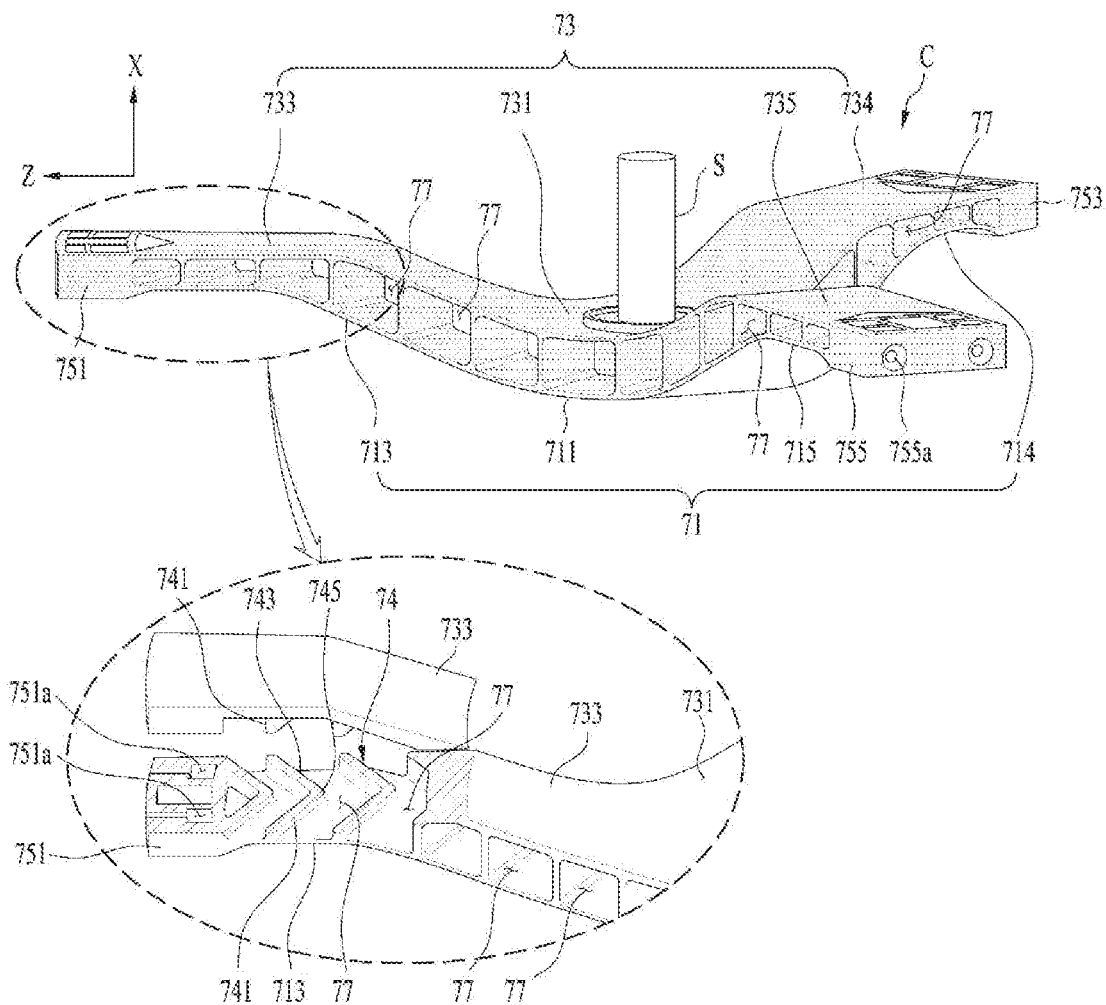
FIG. 4 illustrates another exemplary embodiment of a connector according to the present disclosure.

FIG. 4 illustrates another example of the connector C. The connector C according to this embodiment comprises a structure in which particles and the like may be washed by the water stored in the tub 2 when the drum 3 is rotated.

That is, the connector C according to this embodiment comprises a first body 71 fixed to the second surface 35 (e.g., rear surface) of the drum, a second body 73 to which the rotary shaft S is fixed, and a connecting portion 74 configured to connect the first body 71 with the second body 73. The connecting portion 74 may be configured to form a path through which water passes to a space between the first body 71 and the second body 73 as well as maintain the state in which the first body 71 is spaced apart from the second body 73.

The first body 71 may comprise a first body hub 711 fixed to the second surface 35 and located in the center of rotation of the drum 3, and first body arms 713, 714 and 715 extending from the first body hub 711 toward the rim of the second surface 35.

The second body 73 may comprise a second body hub 731 disposed inside the tub 2, to which the rotary shaft 2 is fixed, and second body arms 733, 734 and 735 extending from the second body hub 731 toward the same direction as the direction, in which the first body arms are extended. The second body hub 731 may be provided in the same shape as that of the first body hub 711 and thus may be parallel to the first body hub 711.

The first body arm may be only comprise a first body first arm 713 extending from the first body hub 711 toward the rim of the second surface 35, and the second body arm may only comprise a second body first arm 733 extending from the second body hub 731 along the direction in which the first body first arm 713 is extended from the first body hub 711.

In this case, the connecting portion 74 may comprise a first connecting body 741 provided to be downwardly inclined from one end (left end of the first body first arm in FIG. 4) of both ends of the first body first arm 713 toward the rotary shaft S, and a second connecting body 743 provided to be downwardly inclined from the other end (right end of the first body first arm in FIG. 4) of both ends of the first body first arm 713 toward the rotary shaft S.

One end of each of the first connecting body 741 and the second connecting body 743 may be fixed to the first body first arm 713, and the other end of each of the first connecting body 741 and the second connecting body 743 may be provided with a board connected to the second body first arm 733.

However, one end of the first connecting body 741 and one end of the second connecting body 743 may be provided so as not to be connected with each other, or may be provided to be connected with each other at a connecting point 745. FIG. 4 illustrates that the two connecting bodies 741 and 743 are configured to meet each other at the connecting point 745, as an example. In any case, the connecting portion 74 may have a V shape pointed toward the rotary shaft S.

If the connecting portion 74 comprises a V-shape pointed toward the rotary shaft S, the connector C may support all of a force acting on a width direction (Y-axis direction) of the first body first arm 713, a force acting on a longitudinal direction (Z-axis direction) of the first body first arm 713, and a force acting on a thickness direction (X-axis direction) of the connector. Therefore, the present disclosure may provide a connector C that may not only stably transfers the rotation power provided by the motor to the drum and but also has high strength.

Although not shown, the connecting portion 74 may comprise a V-shape pointed toward a direction away from the rotary shaft S. That is, the connecting portion 74 may include a first connecting body 741 upwardly inclined from a left end of the first body first arm 713 toward the direction away from the rotary shaft S, and a second connecting body 743 provided to be upwardly inclined from a right end of the first body first arm 713 toward the direction away from the rotary shaft S.

Figure 5:
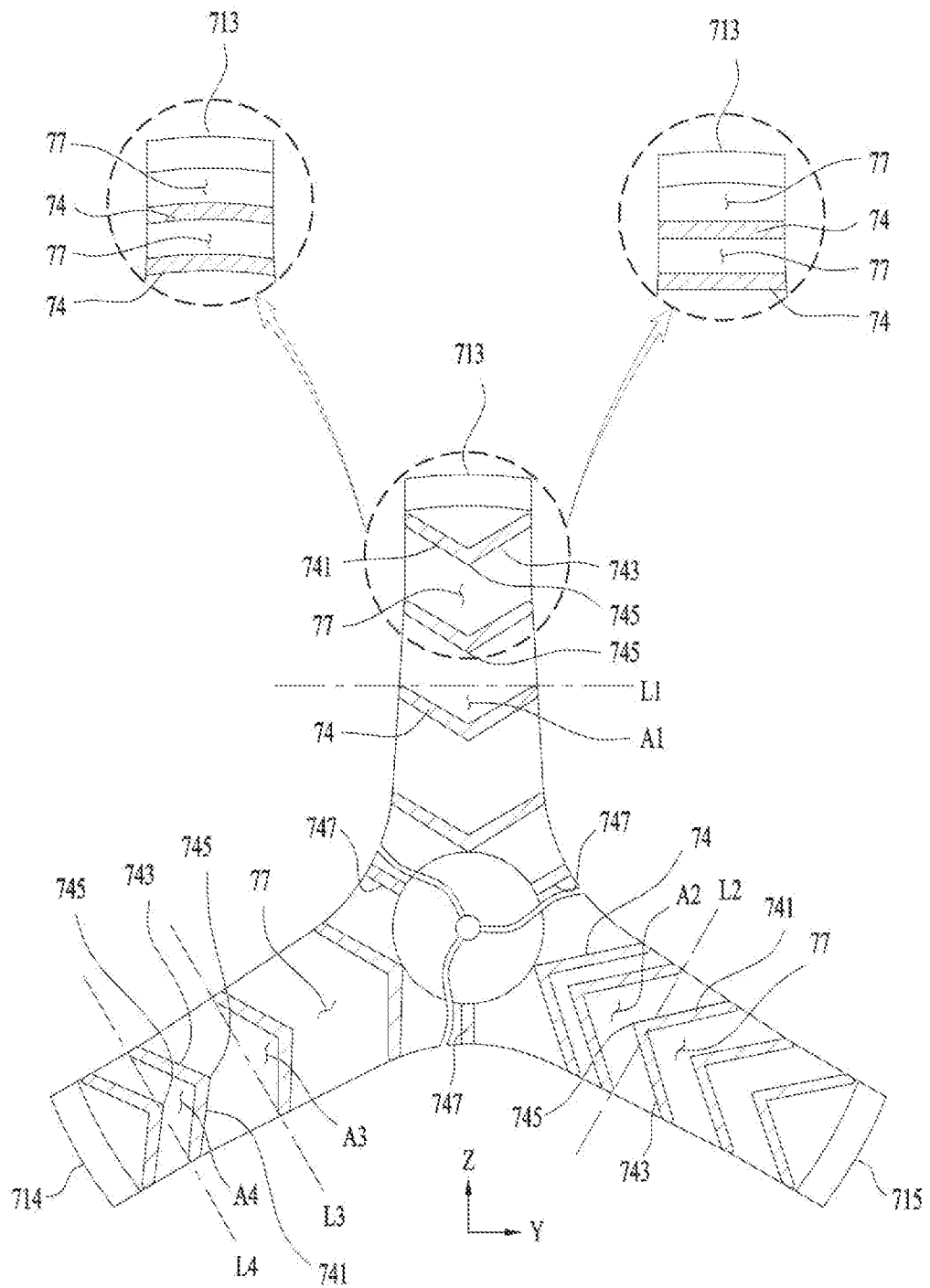
FIG. 5 illustrates another view of the connector of FIG. 4 according to the present disclosure.

Meanwhile, as shown in FIG. 5, the connecting portion 74 may comprise a board shaped connecting body parallel to the width direction (Y-axis direction, that is, direction orthogonal to the direction headed for the free end of the first body first arm from the rotary shaft) of the first body first arm 713.

Moreover, the connecting portion 74 may be disposed along the width direction Y of the first body first arm 713, and may be comprise a board shaped connecting body bent toward a direction (−Z-axis direction) in which the rotary shaft S is located or bent at a certain curvature toward a direction (+Z-axis direction) away from the rotary shaft S.

The connecting portion 74 of the aforementioned structure may comprise a plurality of connecting portions, each of which may be spaced apart from another one along the longitudinal direction (Z-axis direction, that is, direction toward the free end of the first body first arm from the rotary shaft) of the first body first arm 713. As such, a path 77, through which water moves between the respective connecting portions 7, may be formed.

In some embodiments, the first connecting body provided in one connecting portion and the first connecting body provided in another connecting portion are parallel to each other, and the second connecting body provided in one connecting portion and the second connecting body provided in another connecting portion are parallel to each other. As such, manufacturing convenience may be enhanced when the connector is manufactured using a mold.

The water stored in the tub during rotation of the drum (during rotation of the rotor or during rotation of the connector) may move along the path 77 formed by the connecting portion 74. Therefore, the present disclosure may not only minimize particles and the like discharged from laundry remaining in the connector C but also wash the particles remaining in the connector C.

Also, the connector C of the aforementioned structure may minimize a weight of the connector due to the path 77 formed by the connecting portion 74, whereby energy to be supplied to the motor may be minimized due to the weight of the connector (energy required for rotation of the drum is minimized).

Figure 6:
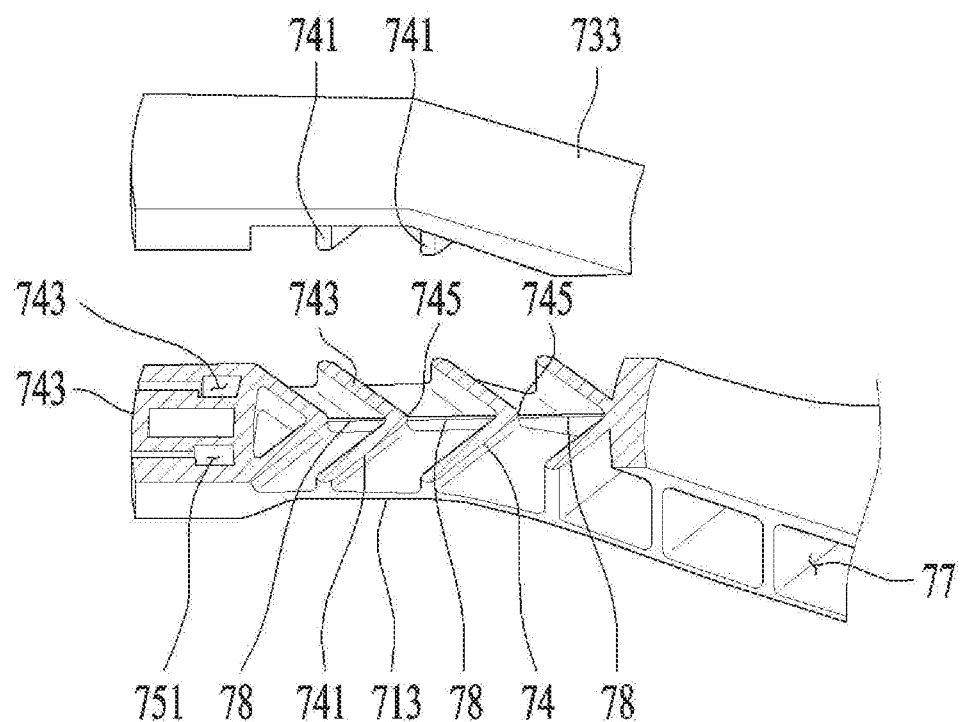
FIG. 6 illustrates another view of the connector of FIG. 4 according to the present disclosure.

As shown in FIG. 6, the connector C may further comprise rib 78 connecting the connecting point 745 provided in one connecting portion to the connecting point 745 provided in another connecting portion, thereby enhancing the strength of the connector. The rib 78 is disposed in at least one of the first body first arm 713 or the second body first arm 733 so as not to block the path 77. That is, the rib 78 is provided so as not to connect the first body first arm 713 with the second body second arm 733 (a height of the rib should be set to be shorter than the interval between the first body arm and the second body arm).

Since the rib 78 is disposed along the longitudinal direction of the first body first arm 713, the first body first arm 713 and the second body first arm 733 may be prevented from being bent toward the second surface 35, or may be prevented from being bent toward the direction away from the second surface 35.

As shown in FIG. 5, in order to increase the amount of water moving through the path 77 and reduce the weight of the connector, the connecting point 745 provided in one connecting portion 74 may be located outside a space A1, formed by connecting (L1) the free end of the first connecting body with the free end of the second connecting body.

However, in order to enhance the strength of the connector C while maintaining the function of the path 77, the connecting point 745 provided in one connecting portion may be located in a space A2, formed by connecting (L2) the free end of the first connecting body with the free end of the second connecting body.

Moreover, the plurality of connecting portions 74 may be provided such that the connecting point 745 located outside a space A3, formed by connecting (L3) the free end of the first connecting body with the free end of the second connecting body, and the connecting point 745 located in a space A4, formed by connecting (L4) the free end of the first connecting body with the free end of the second connecting body, exist.

That is, if the connecting portion is provided to include a first connecting portion, a second connecting portion and a third connecting portion, which are spaced apart from one another along the longitudinal direction of the first body first arm 713, the connecting point, where the first and second connecting bodies constituting the first connecting portion are connected to each other, may be located in the space A4 formed by connecting the free end of the first connecting body and the free end of the second connecting body, which constitute the second connecting portion, with each other. The connecting point where the first and second connecting bodies constituting the second connecting portion are connected to each other may be located outside the space A3 formed by connecting the free end of the first connecting body and the free end of the second connecting body, which constitute the third connecting portion, with each other.

Meanwhile, the first body hub 711 and the second body hub 731 may be connected with each other through a hub connecting portion 747. One end of the hub connecting portion 747 may comprise a board having one end fixed to the first body hub 711 and the other end fixed to the second body hub 731. The hub connecting portion 747 may comprise a plurality of boards spaced apart from one another around the rotary shaft S at the same angle.

The aforementioned connector C has been described assuming that the first body arm is provided with only the first body first arm 713 and the second body arm is provided with only the second body first arm 733. Hereinafter, description will be given assuming that the first body arm is provided with a first body first arm 713, a first body second arm 714, and a first body third arm 715, and the second body arm is provided with a second body first arm 733, a second body second arm 734, and a second body third arm 735.

As shown in FIG. 4, the first body arm may be provided with a first body first arm 713 extending from the first body hub 711 toward the rim of the second surface 35, a first body second arm 714 extending from the first body hub 711 toward the rim of the second surface 35, and a first body third arm 715 extending from the first body hub 711 toward the rim of the second surface 35. In this case, the respective arms 713, 714 and 715 are spaced apart from one another around the rotary shaft S at the same angle)(120°).

The second body arm may comprise a second body first arm 733 extending from the second body hub 731 along the same direction in which the first body first arm 713 extends from the first body hub 711, a second body second arm 734 extending from the second body hub 731 along the same direction in which the first body second arm 714 extends from the first body hub 711, and a second body third arm 735 extending from the second body hub 731 along the same direction in which the first body third arm 715 extends from the first body hub 711.

The free end of the first body first arm 713 and the free end of the second body first arm 733 are connected with each other by a first fastening body 751, which comprises a first fastening groove 751a in communication with the first through hole 355 provided in the fastening rib 353.

Likewise, a second fastening body 753 connecting the free end of the first body second arm 714 and the free end of the second body second arm 734 comprises a second fastening groove 753a in communication with the second through hole 356, and a third fastening body 755 connecting the free end of the first body third arm 715 and the free end of the second body third arm 735 comprises a third fastening groove 755a in communication with the third through hole 357.

The connecting portion 74 comprises a first arm connecting portion connecting the first body first arm 713 to the second body first arm 733, a second arm connecting portion connecting the first body second arm 715 to the second body second arm 734, and a third arm connecting portion connecting the first body third arm 715 to the second body third arm 735.

The structure of the first arm connecting portion, the structure of the second arm connecting portion, and the structure of the third arm connecting portion may be provided in the same manner as the structure of the connecting portion described with reference to FIGS. 4 to 6.

That is, the first arm connecting portion may comprise first and second connecting bodies connecting the first body first arm 713 to the second body first arm 733, the second arm connecting portion may comprise first and second connecting bodies connecting the first body second arm 714 to the second body second arm 734, and the third arm connecting portion may comprise first and second connecting bodies connecting the first body third arm 715 to the second body third arm 735.

Although the aforementioned description is based on the front-loading type laundry treating apparatus, the present disclosure may be applied to a top-loading type laundry treating apparatus. In this case, the inlet 11 should be provided on the upper surface of the cabinet, the tub inlet 23 should be provide on the upper surface of the cylindrical shaped tub body, the first surface provided with the drum inlet should become the upper surface of the drum body 31, and the second surface to which the first body 71 of the connector is fixed should become the lower surface of the drum body 31.

It will be apparent to those skilled in the art that the present disclosure may be embodied in other specific forms without departing from the spirit and essential characteristics of the disclosure. Thus, the above embodiments are to be considered in all respects as illustrative and not restrictive. The scope of the disclosure should be determined by reasonable interpretation of the appended claims and all change which comes within the equivalent scope of the disclosure are included in the scope of the disclosure.

What is claimed is:

1. A laundry treating apparatus comprising:
    a tub configured to store water;
    a drum rotatably disposed inside the tub and configured to store laundry therein; and
    a connector connecting the drum to a rotary shaft of a motor for transferring a rotation power to the drum,
    wherein the connector comprises:
        a first body comprising a first body hub fixed to the drum and a first body arm extending from the first body hub fixed to the drum,
        a second body comprising a second body hub coupled to the rotary shaft and a second body arm extending from the second body hub along the first body arm,
        connecting portions spaced apart from each other and connecting the first body and the second body in a manner that the first body is spaced apart from the second body, and
        a rib disposed between a pair of the connecting portions and connecting the pair of the connecting portions, and
    wherein the rib protrudes from one of the first body arm and the second body arm and is spaced apart from the other of the first body arm and the second body arm.

2. The laundry treating apparatus of claim 1, wherein the rib has a height smaller than the connecting portions to allow water to pass between the connecting portions.

3. The laundry treating apparatus of claim 1, wherein the rib is provided in plural, and each of the ribs is disposed between different pairs of the connecting portions.

4. The laundry treating apparatus of claim 1, wherein paths are defined between the connecting portions and allow water to pass therethrough.

5. The laundry treating apparatus of claim 4, the first body arm extends along a radial direction of the drum, and wherein the paths penetrate between the first body arm and the second body arm in a rotating direction of the drum.

6. The laundry treating apparatus of claim 5, wherein the rib extends across an extending direction of the paths.

7. The laundry treating apparatus of claim 6, wherein the rib extends along the radial direction of the drum.

8. The laundry treating apparatus of claim 6, wherein the rib has a height smaller than the paths to allow water to pass the paths.

9. The laundry treating apparatus of claim 1, wherein the connecting portions extend along a width direction of the first body arm, and the rib extends along a longitudinal direction of the first body arm.

10. The laundry treating apparatus of claim 1, wherein the connecting portions extend along a rotating direction of the drum, and the rib extends along a radial direction of the drum.

11. The laundry treating apparatus of claim 10, wherein the drum comprises:
   a first surface comprising a drum inlet configured to allow laundry to be loaded or taken out therethrough,
   a second surface facing the first surface, and
   a circumferential surface connecting the first surface to the second surface, and
   wherein the first body is fixed to the second surface of the drum, and the first body arm extends toward a rim of the second surface of the drum.

12. The laundry treating apparatus of claim 10, wherein each of the connecting portions includes a first connecting body and a second connecting body connected to each other at a connecting point to form a curved shape or a bent shape of the each of the connecting portions.

13. The laundry treating apparatus of claim 12, wherein the connecting point of the connecting portions points towards the rotary shaft.

14. The laundry treating apparatus of claim 12, wherein the rib is connected to the connecting point of the connecting portions.

15. The laundry treating apparatus of claim 14, wherein the rib is provided in plural, and each of the ribs is disposed between different pairs of the connecting portions, and
   wherein the ribs are aligned along the radial direction of the drum.

16. The laundry treating apparatus of claim 15, wherein a length of one of the ribs is different from a length of another of the ribs.

17. The laundry treating apparatus of claim 16, wherein lengths of the ribs are decreased as being closer to the first body hub.

18. The laundry treating apparatus of claim 1, wherein a distance between one pair of the connection portions is different from a distance between another pair of connecting portions.

19. A laundry treating apparatus comprising:
   a tub configured to store water;
   a drum rotatably disposed inside the tub and configured to store laundry therein; and
   a connector connecting the drum to a rotary shaft of a motor for transferring a rotation power to the drum,
   wherein the connector comprises:
      a first body comprising a first body hub fixed to the drum and a first body arm extending from the first body hub fixed to the drum,
      a second body comprising a second body hub coupled to the rotary shaft and a second body arm extending from the second body hub along the first body arm,
      connecting portions spaced apart from each other and connecting the first body and the second body in a manner that the first body is spaced apart from the second body, and
      a rib disposed between a pair of the connecting portions and connecting the pair of the connecting portions, and
   wherein the connecting portions extend along a rotating direction of the drum, and the rib extends along a radial direction of the drum.

* * * * *